United States Patent
Rachmeler et al.

(10) Patent No.: US 8,166,155 B1
(45) Date of Patent: Apr. 24, 2012

(54) SYSTEM AND METHOD FOR WEBSITE EXPERIMENTATION

(75) Inventors: Kimberly A. Rachmeler, Seattle, WA (US); Paul G. Nordstrom, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 936 days.

(21) Appl. No.: 11/374,935

(22) Filed: Mar. 14, 2006

(51) Int. Cl.
*G06F 15/173* (2006.01)

(52) U.S. Cl. ........ 709/224; 709/200; 709/203; 709/217; 709/218

(58) Field of Classification Search ................ 705/7, 10; 709/205, 217, 224
See application file for complete search history.

(56) References Cited

U.S. PATENT DOCUMENTS

| | | | |
|---|---|---|---|
| 6,038,598 | A | 3/2000 | Danneels |
| 6,714,975 | B1 | 3/2004 | Aggarwal et al. |
| 7,295,995 | B1 | 11/2007 | York et al. |
| 7,467,349 | B1 | 12/2008 | Bryar et al. |
| 2002/0046281 | A1* | 4/2002 | Cope .............................. 709/227 |
| 2002/0062245 | A1* | 5/2002 | Niu et al. ........................ 705/14 |
| 2002/0078141 | A1 | 6/2002 | Cohen et al. |
| 2002/0116244 | A1 | 8/2002 | Honarvar et al. |
| 2002/0133720 | A1* | 9/2002 | Sherman et al. ............... 713/201 |
| 2002/0174219 | A1* | 11/2002 | Mei et al. ....................... 709/224 |
| 2003/0101265 | A1* | 5/2003 | Dantzig et al. ................. 709/226 |
| 2003/0208578 | A1* | 11/2003 | Taraborelli et al. ........... 709/223 |
| 2004/0153358 | A1* | 8/2004 | Lienhart ......................... 705/10 |
| 2004/0199584 | A1* | 10/2004 | Kirshenbaum et al. ........ 709/205 |
| 2005/0119939 | A1 | 6/2005 | Henning et al. |
| 2005/0262240 | A1* | 11/2005 | Drees et al. .................... 709/224 |
| 2006/0224583 | A1* | 10/2006 | Fikes et al. ..................... 707/6 |
| 2007/0061412 | A1* | 3/2007 | Karidi et al. .................. 709/217 |
| 2007/0162260 | A1 | 7/2007 | Nordstrom |

OTHER PUBLICATIONS

Bryar, C.M. et al., Displaying Links at Varying Levels of Prominence to Reveal Emergent Paths Based on User Interaction, U.S. Appl. No. 11/186,357, filed Jul. 21, 2005.
Bryar, C.M., et al., Method and System for Displaying a Hyperlink at Multiple Levels of Prominence Based on User Interaction, U.S. Appl. No. 12/238,829, filed Oct. 9, 2008.
Nordstrom, P.G., et al., Method and System for Collecting and Analyzing Time-Series Data, U.S. Appl. No. 11/374,875, filed Mar. 14, 2006.
Pope, E.E., et al., Method and System for Determining Interest Levels of Online Content Based on Rates of Change of Content Access, U.S. Appl. No. 11/238,070, filed Sep. 28, 2005.
Pope, E.E., et al., System and Method for Indicating Interest of Online Content, U.S. Appl. No. 11/238,079, filed Sep. 28, 2005.
Scofield, C.L, et al., Method and System for Determining Interest Levels of Online Content Navigation Paths, U.S. Appl. No. 11/321,890, filed Dec. 29, 2005.
Scofield, C.L., et al., Method and System for Determining Interest Spaces Among Online Content Sources, U.S. Appl. No. 11/321,895, filed Dec. 29, 2005.

(Continued)

*Primary Examiner* — Kevin Bates
*Assistant Examiner* — Mohammed Ahmed
(74) *Attorney, Agent, or Firm* — Lee & Hayes, PLLC

(57) ABSTRACT

A data processing system comprises web page generation logic and website experimentation logic. The web page generation logic is configured to generate web pages to be provided to visitors of a website. The website experimentation logic is coupled to the web page generation logic. The website experimentation logic is configured to detect a change in the manner in which the web page generation logic generates one or note of the web pages and to assess how the change impacts visitor interactions with the website.

27 Claims, 9 Drawing Sheets

OTHER PUBLICATIONS

Scofield, C.L., et al., Method and System for Associating Keywords With Online Content Sources, U.S. Appl. No. 11/321,697, filed Dec. 29, 2005.

York, J., and R. Kohavi, Continuous Usability Trial for a Website, U.S. Appl. No. 11/291,507, filed Dec. 1, 2005.

Eisenberg, B., How to Increase Conversion Rate 1,000 Percent, Incisive Interactive Marketing LLC, <http://www.clickz.com/experts/crm/traffic/article.php/1756031> [accessed Jun. 7, 2006], Copyright 2006.

Eisenberg, B., How to Improve A/B Testing, Inetasia Solutions Limited, <http://www.inetasia.com/webtrends/how_to_improve_ab_testing.html> [accessed Jun. 8, 2006].

Eisenberg, B., How to Decrease Sales by 90 Percent, Incisive Interactive Marketing LLC, <http://www.clickz.com/experts/crm/traffic/article.php/1588161>, Copyright 2006.

Kohavi, R., and M. Round, Emetrics Summit 2004: Front Line Internet Analytics at Amazon.com, Amazon.com, Copyright 2004.

Memetrics: Multivariate Testing Delivers Results, Memetrics holdings Pty Limited, <http://www.memetrics.com>, Copyright 2002-2006.

Offermatica: How Can It Help Me?, Offermatica Corp., <http://www.offermatica.com/> [accessed Jun. 8, 2006], Copyright 2006.

Maximize Conversion Rates Increase Your Revenue: The Quickest, Most Cost-Effective Way to Better Conversion Rates and Customer Satisfaction!, Optimost LLC, <http://www.optimost.com/>, Copyright 2002-2006.

Rossi, P.H., et al., Evaluation: A Systematic Approach, Sage Publications, Inc., 2004, Thousand Oaks, California, U.S.

Sterne, J., Web Metrics: Proven Methods for Measuring Web Site Success, John Wiley & Sons, Inc., 2002.

Touch Clarity Targeting: If You Can't Measure the Return From Software, Don't Buy It, Touch Clarity Ltd., <http://www.touchclarity.com> [accessed Jun. 8, 2006], Copyright 2005.

What is Offermatica?, Offermatica Corp., <http://www.offermatica.com/whatis-1.0.html> [accessed Jun. 23, 2006], Copyright 2006.

York, J., Continuous Usability Trial for a Website, U.S. Appl. No. 11/291,507, Dec. 1, 2005.

Bryar, C.M., et al., Method and System for Displaying a Hyperlink at Multiple Levels of Prominence Based on User Interaction, U.S. Patent Appl. No. 12/248,829, filed Oct. 9, 2008.

Office action for U.S. Appl. No. 11/291,507, mailed on Oct. 27, 2008, Jeremy York, "Continuous Usability Trial for a Website", 34 pages.

Office action for U.S. Appl. No. 11/291,507, mailed on Oct. 8, 2009, Jeremy York, "Continuous Usability Trial for a Website", 28 pages.

Office action for U.S. Appl. No. 11/291,507, mailed on Mar. 29, 2010, Jeremy York, "Continuous Usability Trial for a Website", 42 pages.

Office action for U.S. Appl. No. 11/291,507, mailed on Jun. 3, 2009, Jeremy York, "Continuous Usability Trial for a Website", 26 pages.

Bryar, et al., Method and Systems for Displaying a Hyperlink at Multiple Levels of Prominence Based on User Interaction, U.S. Appl. No. 12/248,829, filed Oct. 9, 2008.

Nordstrom, P.G., et al., Method and System for Collecting and Analyzing Time-Series Data, U.S. Appl. No. 11/374,875, filed Mar. 14, 2006.

Pope, E.E., et al., Method and System for Determining Iterest Levels of Online Content Based on Rates of Change of Contecnt Access, U.S. Appl. No. 11/238,070, filed Sep. 28, 2005.

Pope, E.E., et al., System and Method for Indicating Interest of Online Content, U.S. Appl. No. 11/238,079, filed Sep. 28, 2005.

Scofield, C.L., et al., Method and System for Determining Interest Levels of Online Content Navigation Paths, U.S. Appl. No. 11/321,890, filed Dec. 29, 2005.

Scofield, C.L., et al., Method and System for Determining Interest Spaces Among Online Content Sources, U.S. Appl. No. 11/321,895, filed Dec. 29, 2005.

Scofield, C.L., et al., Method and System for Associating Keywords With Online Content Sources, U.S. Appl. No. 11/321,697, filed Dec. 29, 2005.

http://www.memetrics.com, printed off the internet Jun. 23, 2006, 1 page.

http://www.offermatics.com.whatis-1.0.html.

Kohavi, Ronny et al., "Emetrics Summit 2004: Front Line Internet Analytics at Amazon.com", Copyright 2004, Amazon.com, 31 pages.

Rossi et al., "Evaluation: A Systematic Approach", Seventh Edition, 2003, entire book.

Sterne, Jim "Web Metrics—Proven Methods for Measuring Web Site Success" Wiley Publishing, Inc. 2002, entire book.

* cited by examiner

SYSTEM AND METHOD FOR WEBSITE EXPERIMENTATION

BACKGROUND

It is often desirable to configure a website to best meet the needs of visitors of the website. Many visitors, however, are not interested in taking the time to provide feedback concerning a website. Accordingly, experimentation tools have been developed to test the popularity of features, to test how visitors react to certain features, and to otherwise track visitor interaction with a website in order to obtain feedback which may be used to modify the website to improve the service provided to visitors.

A situation that may arise in the context of website experimentation is that a given website may be constantly changing. Features available on the website at one point in time may not be available at another point in time. Such changes may result from, for example, service interruptions or failures, changes in the program logic that supports hosting of the website, the operation of system optimization algorithms, changes in advertising campaigns, and/or other random or pseudo-random disturbances in the operation of the website. A website that is constantly changing is often seen as posing a problem for website experiments. That is, to the extent that such changes are constantly occurring in the way the website is presented to visitors, it is considered more difficult to conduct carefully planned tests over an extended period of time.

An ongoing need exists for systems and methods that may be used to perform website experimentation. It will be appreciated that while the teachings herein describe certain features and advantages that may be achieved, the teachings herein may be used to implement systems and methods that do not necessarily achieve any of these features or advantages, but rather achieve other features and advantages.

SUMMARY

One embodiment relates to a computer-implemented data processing system comprising web page generation logic and website experimentation logic. The web page generation logic is configured to generate web pages to be provided to visitors of a website. The website experimentation logic is coupled to the web page generation logic. The website experimentation logic is configured to detect a random or pseudo-random change in the manner in which the web page generation logic generates one or more of the web pages and to assess how the change impacts visitor interactions with the website.

Another embodiment relates to a computer-implemented data processing method comprising detecting a change in the presentation of one or more web pages to visitors of a website. Responsive to the detecting step, how the change impacts visitor interactions with the website is assessed.

Another embodiment relates to a data processing method for use in a computer-implemented service framework architecture comprising services that respond to service requests. The method comprises receiving first and second assessments of a service. The service provides information to be used in generating one or more web pages. The first assessment comprises an assessment of a relative state of health of the service. The second assessment comprises an assessment of a relative importance of the service to a task being performed and is provided based on importance ranking information. Access to the service is mediated according to the first and second assessments. The method further comprises obtaining feedback regarding how the manner in which access to the service is mediated impacts visitor interactions with the website, and updating the importance ranking information based on the feedback.

DETAILED DESCRIPTION OF EXEMPLARY EMBODIMENTS

Figure 1:
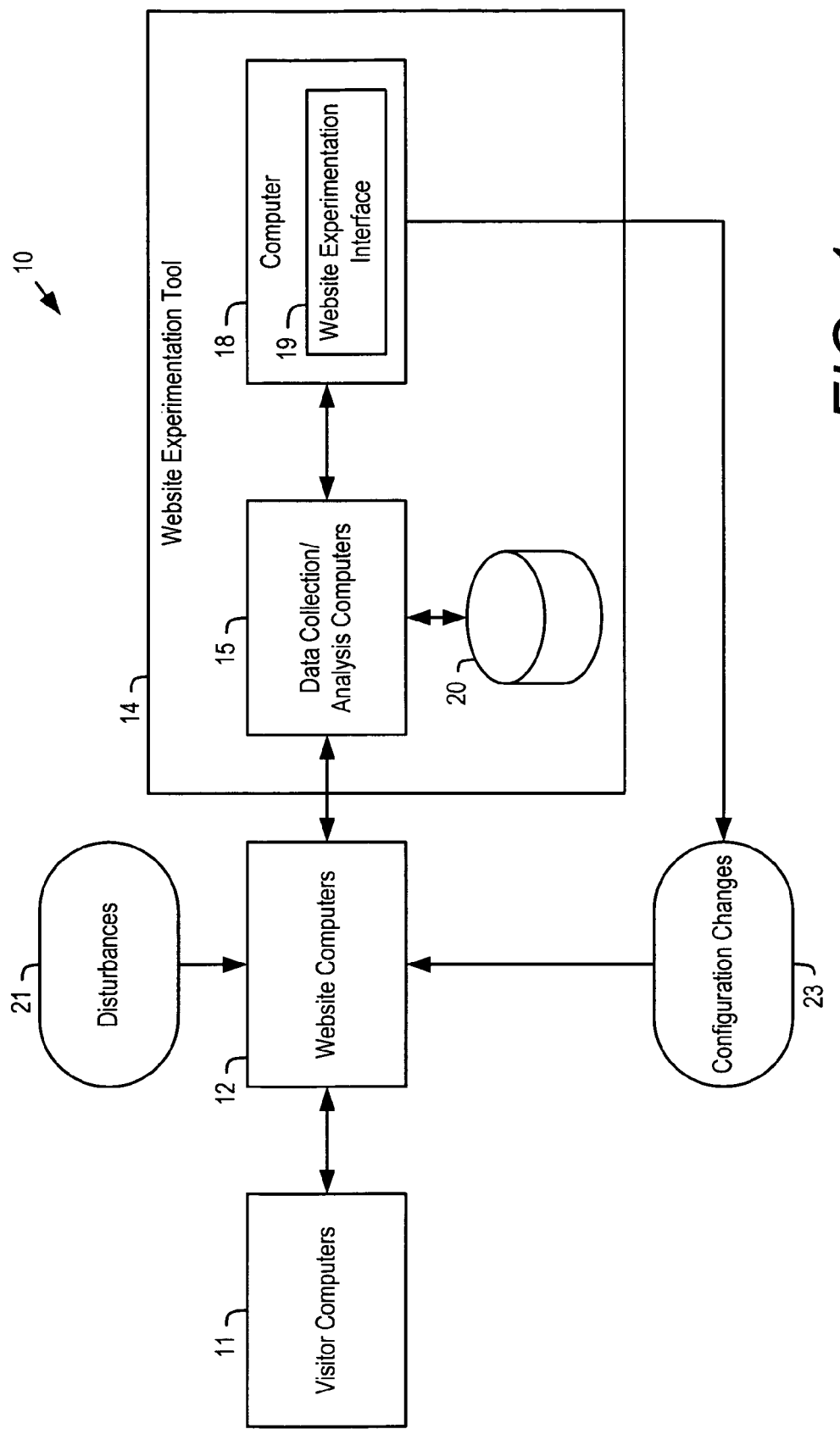
FIG. 1 is a block diagram of a data processing system according to an exemplary embodiment.

Referring now to FIG. 1, a data processing system 10 according to an exemplary embodiment is shown. The data processing system 10 comprises visitor computers 11, website computers 12, and a website experimentation tool 14. The website experimentation tool 14 further includes data collection/analysis computers 15 and a computer 18 with a website experimentation interface 19.

The visitor computers 11 may be used by visitors to access one or more websites hosted by the website computers 12. The visitor computers 11 may comprise personal computers, handheld wireless devices (e.g., personal digital assistants, mobile phones, portable music players, and so on), television set top boxes, and other types of computers that may be used by visitors to access websites. The computers 11 may access the website computers 12 by way of a communication network, such as the Internet.

The website computers 12 may comprise one or more computers (e.g., servers) that host the website. For example, the website computers 12 may publish web pages to visitors of the websites. The website may, for example, be an interactive commerce website. It is assumed that the exact nature and content of the web pages published by the website computers 12 may be constantly changing over time, e.g., due to service failures, due to changes in the program logic that supports hosting of the website, due to the operation of system optimization algorithms, due to changing advertising campaigns, and/or due to other random or pseudo-random disturbances in the operation of the website.

The website experimentation tool 14 comprises data collection/analysis computers 15 which are configured to collect, sort, process, and index data generated by the website computers 12 concerning operation of the website. In an exemplary embodiment, the data collection/analysis computers 15 may be implemented in accordance with the teachings of U.S. Ser. No. 11/375,636, entitled "Method and System for Collecting and Analyzing Time-Series Data," filed concurrently herewith ("the Ser. No. 11/375,636 application"), hereby incorporated by reference. In such an embodiment, the data collection/analysis computers 15 of the present application may correspond to what is designated as the data collection/analysis computers 15 of the Ser. No. 11/375,636 application. Further, the website computers 12 of the present application may correspond to what is designated as the data source computers 12 of the Ser. No. 11/375,636 application.

In an exemplary embodiment, and in accordance with the teachings of the aforementioned Ser. No. 11/375,636 application, the data collection/analysis computers 15 may receive one or more data messages from the website computers 12 each time a web page is published to a visitor. For example, a log record (e.g., "a querylog record") may be sent to the data collection/analysis computers 15 which comprises information concerning the web page published to the visitor. The log record may, for example, contain enough information for the page to be identically recreated along with a time stamp indicating the time the page was published for the visitor. Any additional information that is desired to be collected may also be included in the log record, such as the amount of time taken to produce the page, the services that were called during production of the page, and so on. To generate such log records, the program logic for the website computers 12 may include log record statements which cause specified data to be saved in a log record file and transmitted to the data collection/analysis computers 15. The data collected from the website computers 12 may be stored in a data repository 20.

As will be appreciated, to the extent that the website computers 12 are generating log records in connection with each web page published, and to the extent that the number of computers 12 is large, the rate of the data that is generated by the website computers 12 may be large. As described in greater detail in the Ser. No. 11/375,636 application, the data collection/analysis computers 15 may be configured to collect, sort, process and index this data substantially in real-time as it received from the website computers 12. For example, the data collection/analysis computers may comprise a plurality of nodes (e.g., implemented on different servers) and a plurality of partitions owned by the plurality of nodes. The plurality of partitions may comprise processes configured to receive data messages from the website computers 12 and to process the data messages to produce result outputs for the website experiments. The plurality of partitions may be configured to permit each of the data messages from the website computers 12 to be received at an arbitrary one of the nodes and to forward the data message to one or more other nodes responsible for participating in producing the results.

The website experimentation tool 14 also comprises website experimentation interface 19 which is provided on a computer 18 and which may be used to access the results of website experiments. In the context of a system in which the data collection/analysis computers 15 are implemented in accordance with the teachings of the aforementioned Ser. No. 11/375,636 application, the website experimentation interface 19 may be provided on one of the user computers 18 of the aforementioned Ser. No. 11/375,636 application. The website experimentation interface 19 may be used by users (e.g., human users such as website developers, data analysis computers, and/or other users) to access the outputs of the data collection/analysis computers 15. For example, the website experimentation interface 19 may be used to view a notification that a certain result has been detected in the context of a website experiment along with the results of the experiment. The website experimentation interface 19 may also perform additional manual and/or automated analysis of the outputs to generate additional data, notifications, and so on. The website experimentation interface 19 may also be used to modify configuration settings of the website computers 12 to update the presentation of web pages responsive to results of the website experiments.

Although the computers 12, 15 and 18 are shown as being separate and serving separate functions, it will be understood that the same physical computer may serve multiple functions within the system 10. For example, a given server may be running a process that supports the data collection/analysis function described as being performed by the computers 15 and may simultaneously be running another process that supports other user analysis functions described as being performed by the computers 18. Likewise, although the computer 18 which includes the website experimentation interface 19 is shown as being separate from the data collection/analysis computers 15, it will be understood that the same physical computer may be used in connection with both functions.

Figure 2:
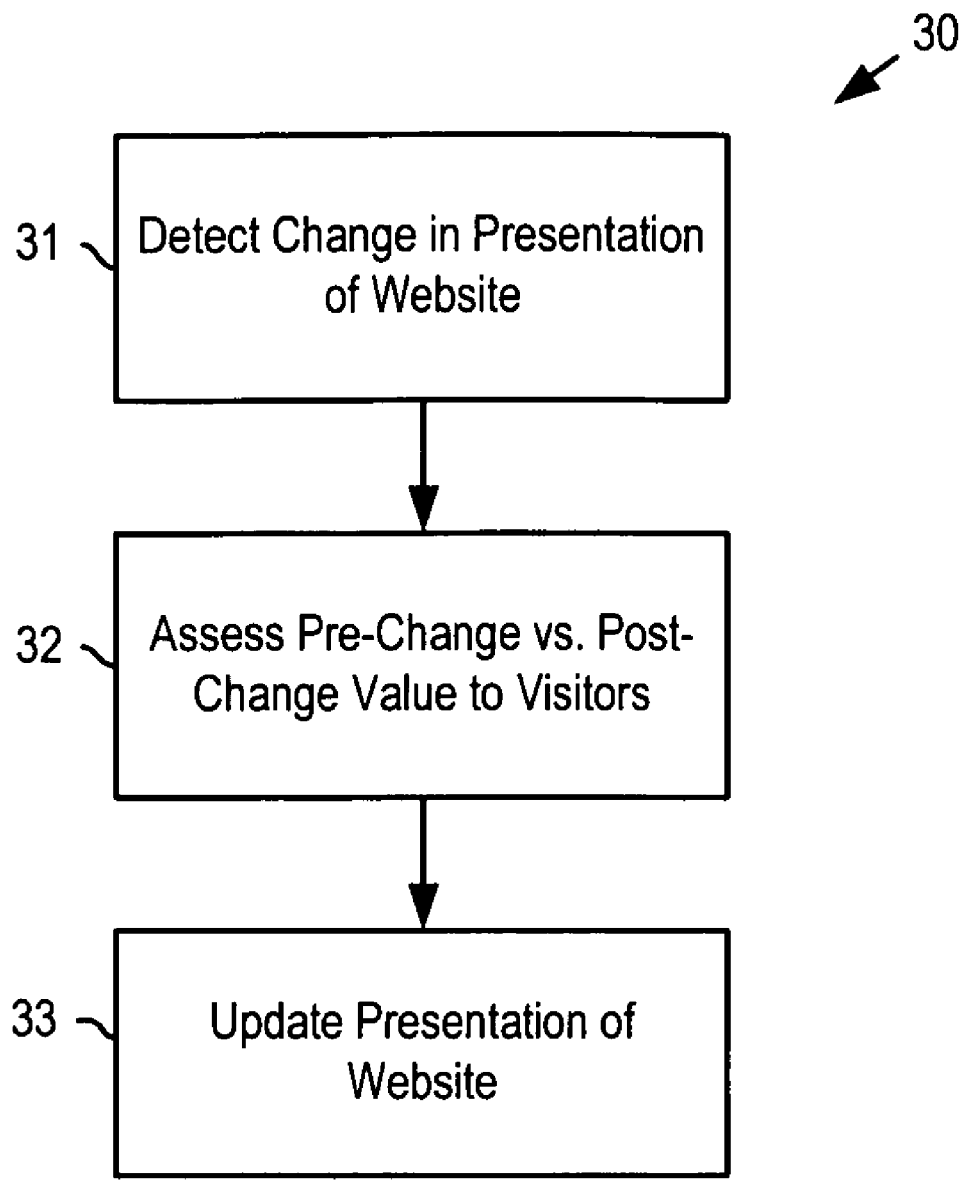
FIG. 2 is a flowchart of a website experimentation process implemented by the system of FIG. 1 according to an exemplary embodiment.

Referring now also to FIG. 2, FIG. 2 is a flowchart of a website experimentation process 30 that may be implemented by the data processing system 10 of FIG. 1. In an exemplary embodiment, the data processing system 10 may be configured to automatically conduct website experiments responsive to changes in the presentation of the website. Such website experiments may be unplanned and may be triggered in response to such changes being detected. Each website experiment may be configured to assess the impact of a given change on visitor interactions with the website, and thereby to assess any change in value delivered to visitors of the website which result from the change in the presentation of the website. Such website experiments may be conducted instead of or in addition to other more carefully planned website experiments.

Thus, in operation a random or pseudorandom disturbance 21 (see FIG. 1) may be introduced which causes the presentation of the website to visitors to change. For example, the disturbance 21 may be the failure of a service within the website computers 12, such as a service that provides a particular piece of information that is normally published on a particular web page. As a result, the information that is normally published with the web page is not published on the web page. As another example, the disturbance 21 may be the operation of a website optimization algorithm which causes the way one or more items are displayed on a web page to change. For example, a website optimization algorithm may discern visitor preferences/interests and, on this basis, determine that certain items should be displayed more prominently on a web page. As another example, the disturbance 21 may be a change implemented responsive to detection of a visitor preference/interest (either implicitly or explicitly specified by the customer) by the website optimization algorithm, such that the detection of the visitor preference/interest may be used as a trigger to test a particular layout or feature on other visitors. As another example, the disturbance 21 may be a manually implemented change to the website which appears unexpectedly from the perspective of the website experimentation tool 14. For example, a website developer may change the presentation of one or more web pages to change or add one or more additional features (e.g., to add new fields, to change existing fields to provide different information, and so on). As another example, the disturbance 21 may be caused as a result of a network partition which is preventing the flow of data needed for the presentation of one or more of the features. As used herein, the term "random or pseudo-random disturbance" is intended to encompass each of the above disturbances.

FIG. 2 shows the operation of the data collection/analysis computers 15 when such a change occurs. At step 31, the change in the presentation of the website is detected by the data collection/analysis computers 15. The change in the presentation of the website may be detected based on a notification received from the website computers 12. For example, and as described in greater detail below in connection with FIGS. 4-5, the website computers 12 may transmit such a notification if a service becomes unavailable. As another example, the website computers 12 may transmit such a notification if a website optimization algorithm changes the presentation of a web page. As another example, the website computers 12 may transmit such a notification if the configuration of a web page is manually changed (e.g., a new field is added, an existing field is changed, etc).

In an exemplary embodiment, a user may insert an calculation descriptor in a calculation table of the data collection/analysis computers 15. Website experiments may then be performed responsive to the detection of the change in combination with the insertion of the calculation descriptor in the calculation table. As described in the Ser. No. 11/375,636 application, calculation descriptors may be inserted into the calculation table to permit users to specify processing to be performed by the data collection/analysis computers 15. For example, the calculation descriptor may specify parameters of changes which, if met, should trigger a website experiment. In another exemplary embodiment, rules logic is included which allows rules to be established to decide what types of changes should trigger a website experiment. In another exemplary embodiment, each change in the presentation of the website triggers a website experiment.

At step 32, the change in value delivered to visitors of the website as a result of the change in the presentation of the website is assessed. For example, if a particular service is unavailable, and certain information normally provided on a certain web page is not provided, it may be determined whether there is any perceptible change in the value received by visitors due to the information not being provided. As another example, if a website optimization algorithm changes the manner in which certain items are displayed, it may be determined whether there is any perceptible change in the value received by visitors due to the change in the manner in which the items are displayed. As another example, if a field is added or changed on a web page, it may be determined whether there is any perceptible'change in the value received by visitors due to the added or changed field.

The value received by visitors may be assessed by tracking visitor interactions with the website and assessing how visitor interactions change responsive to the change in the presentation of the website. The value received by visitors may be assessed based on numerous visits to the website by different visitors, for example, so that a statistically significant sample may be obtained. Performance ratings may be applied to features that have been shown to visitors to establish how strongly the feature is correlated with a particular visitor interaction, such as whether a visitor selects a particular link. If a particular change results in visitors selecting a particular link a higher percentage of time, then greater value may have been received by the visitors. In another exemplary embodiment, discussed in greater detail below in connection with FIGS. 6A-6C and FIG. 7, visitor traffic patterns may be evaluated to assess the change in value delivered to visitors. The value may be assessed by the data collection/analysis computers 15 substantially in real-time or as part of a historical analysis.

When a result that is potentially of interest has been produced by the website experiment, the data collection/analysis computers 15 may generate a result notification or other result output to indicate that the result has been produced. For example, the data collection/analysis computers 15 may generate a result notification if a change in value has been detected and the change in value is considered to be statistically significant. Alternatively, the data collection/analysis computers 15 may generate a result notification as soon as enough samples have been collected to produce statistically significant results, even when no change in value has been detected. For example, if a feature has been temporarily removed from a web page, and if no change in value has been detected even after enough samples have been collected to produce statistically significant results, then this may be of interest. For example, this may indicate that no discernable value was delivered by the feature and may prompt its permanent removal.

In an exemplary embodiment, when a result notification is generated, the result notification may be transmitted to the website experimentation interface 19 for review by a human user. The human user may also be provided with other details concerning the nature of the experiment performed and the results that were generated (e.g., the feature that was removed, information concerning the web page from which the feature was removed, and so on). Results may also be filtered and/or prioritized. For example, results may be filtered so that the human users are only provided with experiment results where the results meet predetermined parameters (e.g., statistical reliability thresholds, value thresholds, and so on). The results may be prioritized by assigning weights to the predetermined parameters that are examined and then combining the weighted values to generate an overall score which assigns a higher ranking to those results that are likely to be of the greatest interest (e.g., due to a higher statistical reliability, due to higher value, and so on). Thus, although experiments may constantly be performed to assess the impact of changes to the website, the results of the experiments may be filtered or prioritized such that only those experiments which produce the most interesting results are presented to human users.

At step 33, the presentation of the website may be changed (e.g., configuration change 23 in FIG. 1) to reflect feedback obtained during steps 31 and 32. The decision to change the presentation of the website in step 36 may be made automatically, manually, or a combination thereof. For example, logic may be included to automatically remove a feature if a website experiment indicates that removing it does not cause any loss in value to visitors. In another exemplary embodiment, a proposed change may be presented for approval at the website experimentation interface 19, and the user may accept/reject the change as appropriate. Logic may also be included for determining which changes are implemented automatically and which changes require human approval.

As will be appreciated from the process of FIG. 2, significant amounts of useful feedback may be obtained, even where the website is constantly changing due to random disturbances that are not part of a larger overall plan. Indeed, it is the constant changing of the website that facilitates experiments and that allows such feedback to be obtained. The data processing system 10 may thus provide a learning system that assesses value provided to visitors and use the results of the assessment to provide a better experience for the visitors.

Figure 3:
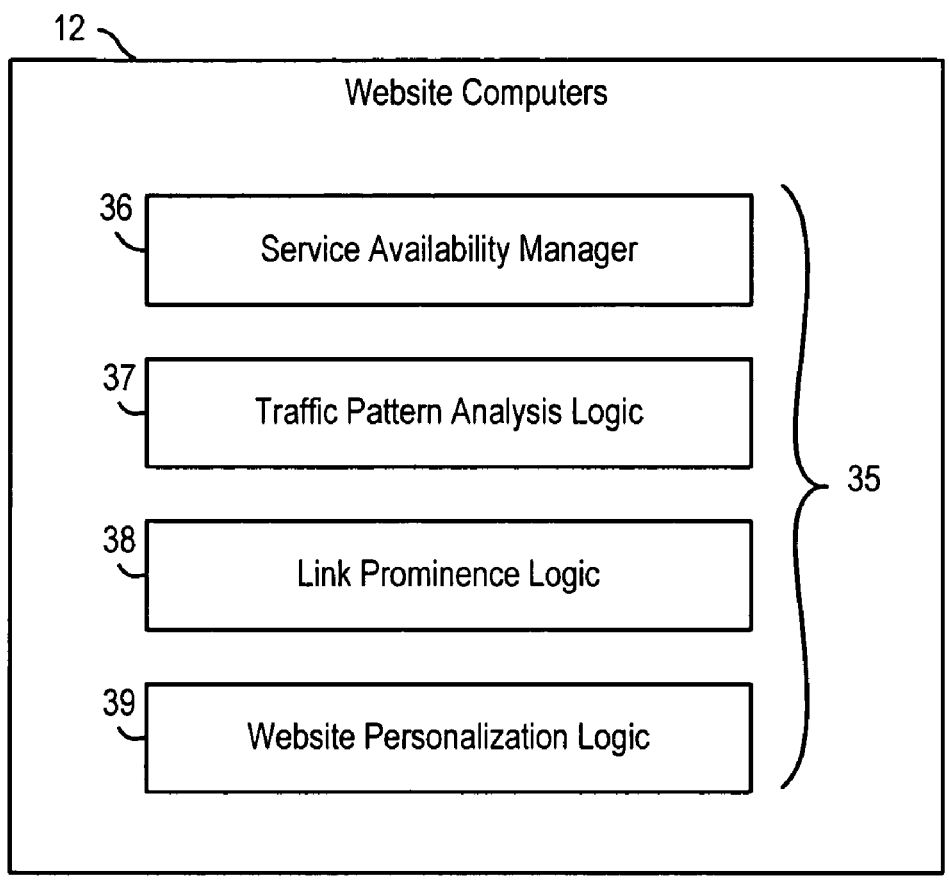
FIG. 3 is a block diagram of features implemented by website computers of FIG. 1 according to an exemplary embodiment.

Referring now to FIG. 3, the website computers 12 may comprise one or more components 35 which may be used in connection with the website experimentation process 30 of FIG. 2. The website computers 12 may include a service availability manager 36 which is implemented in accordance with the teachings of U.S. Ser. No. 11/329,665, entitled "System and Method for Service Availability Management," filed Jan. 11, 2006 ("the '665 application"), hereby incorporated by reference. As will be described in greater detail below in connection with FIGS. 4-5, the data collection/analysis computers 15 may be configured to conduct website experiments to improve the manner in which the service availability manager 36 uses importance ranking information in situations where services become overloaded and are not able to respond to at least some service requests.

The website computers 12 may further include traffic pattern analysis logic 37. In an exemplary embodiment, the traffic pattern analysis logic may be implemented in accordance with the teachings of U.S. Ser. No. 11/321,890, entitled "Method and System for Determining Interest Levels of Online Content Navigation Paths," filed Dec. 29, 2005 ("the '890 application"), hereby incorporated by reference. The '890 application discloses techniques which may, for example, be used to highlight the most heavily trafficked links on a web page or website. Such techniques may also be used in connection with conducting website experiments. For example, such techniques may be used to assess value delivered to visitors of a website, as described in greater detail below in connection with FIGS. 6A-6C and FIG. 7.

The website computers 12 may further include link prominence logic 38. In an exemplary embodiment, the link prominence logic 38 is implemented in accordance with the teachings of U.S. Ser. No. 11/186,357, entitled "Displaying Links at Varying Levels of Prominence to Reveal Emergent Paths Based on User Interaction," filed Jul. 21, 2005 ("the '357 application"), hereby incorporated by reference. The '357 application discloses techniques which may, for example, be used to help visitors identify links that have been more frequently selected in the past or that are otherwise considered helpful or useful. Such techniques may also be used in connection with helping users identify links that are helpful or useful as indicated by the results of website experiments, as discussed below.

The website computers 12 may further include website personalization logic 39. In an exemplary embodiment, website personalization logic 39 may be configured to segment visitors and to use the information learned in website experiments to modify presentation of the website on a segment-by-segment basis. Thus, for example, the nature of the website that is presented (e.g., level of complexity, color schemes, and so on) may be customized to a particular user based on the results of website experiments.

Figure 4:
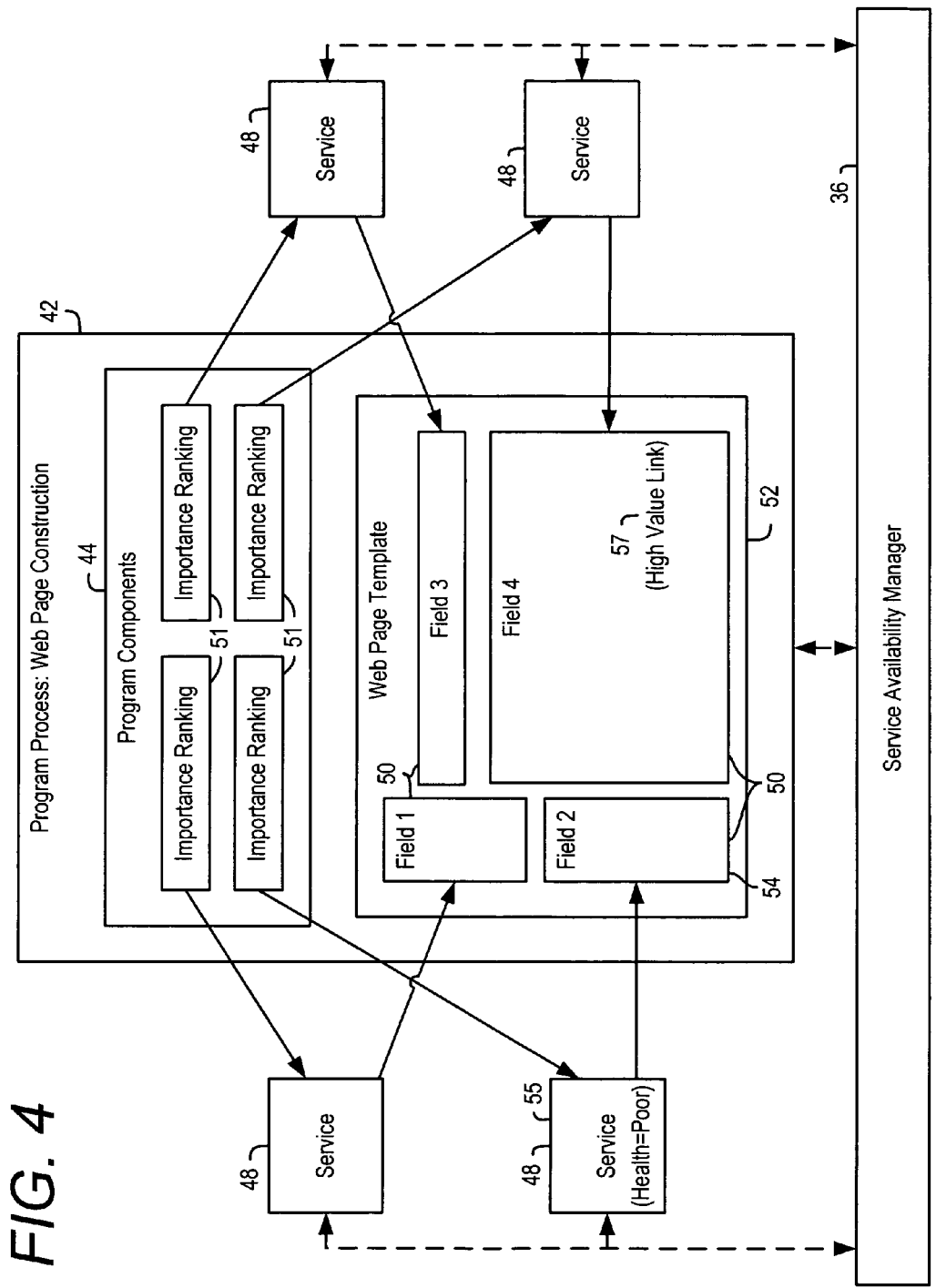
FIG. 4 is a block diagram of a data processing system that generates web pages according to an exemplary embodiment.
Figure 5:
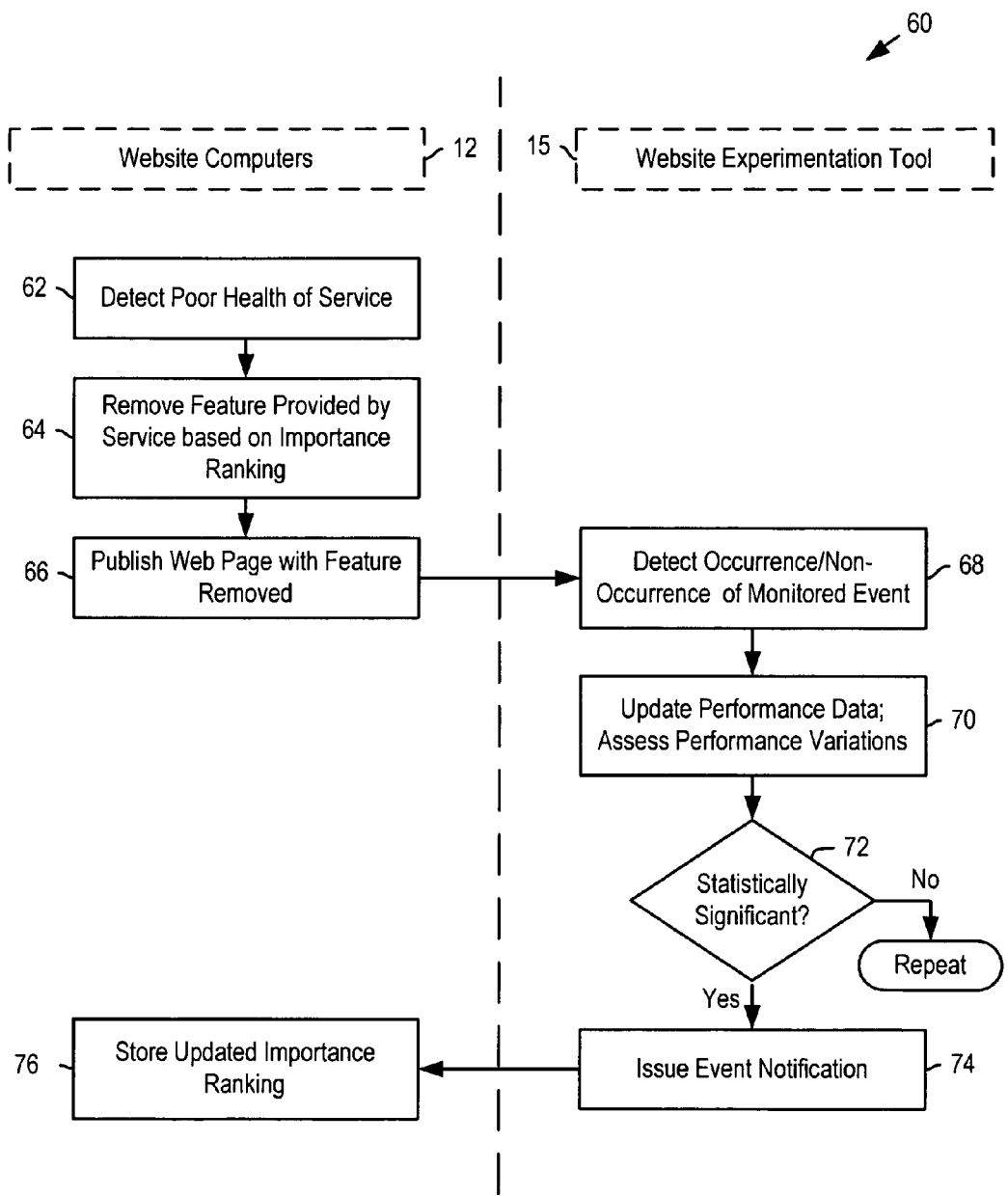
FIG. 5 is a flowchart of a website experimentation process implemented in connection with the system of FIG. 4 according to an exemplary embodiment.

Referring now also to FIGS. 4-5, another example with additional details is described. In the example of FIGS. 4-5, in an exemplary embodiment, the presentation of the web page may change due to variations in the health of a service that provides information for publication with the web page. Referring first to FIG. 4, a program process 42 is shown that may be running in the website computers 12 and that is configured to construct web pages. The program process 42 comprises program components 44 which make service requests to services 48 which are part of a service framework. For example, the program components 44 may construct web pages by requesting certain data from the services 48 and using the data received from the services 48 to populate fields 50 in a web page template 52.

As described in greater detail in the '665 application, service requests may be made to the same service 48 from different program components that produce different web pages. Depending on the web page, information that is considered critical in the context of one web page may be considered optional in the context of another web page. Accordingly, an importance ranking 51 may be associated with each service request based on importance ranking configuration information stored in the service availability manager 36. The importance ranking may be configured differently for each service 48 and for each different program component within each different process that sends service requests to a particular service 48.

The importance ranking information may be used in determining which service requests are permitted to be made to a service 55 that has poor health. For example, if there is statistical evidence that a service 48 is in trouble, then less critical service requests may not be sent to the service 48, while more critical service requests may continue to be sent. If a service 48 is already overloaded, the decision not to permit a service request protects the service 48 from taking on additional load which may cause the service 48 to fail. Thus, this arrangement helps protect the service 48 from failing while at the same time permits the service 48 to continue responding to critical service requests.

In an exemplary embodiment, the website experimentation process of FIG. 2 is used to determine an optimal value for the importance ranking information, for example, whether a service request is considered "critical" or "not critical." A non-binary (e.g., floating point value) ranking scheme may also be used. The data processing system 10 may learn over time what traffic paths are valuable and therefore what features are critical. The value of the feature as determined through website experimentation may then be used to configure the importance ranking information. Also, whether the importance ranking information is configured dynamically or manually may be configured separately for each service 48 and for each different program component within each different process that sends service requests to a particular service 48. For example, if a feature is known to be critical, the importance ranking information for the associated service request may be manually designated as critical.

Referring now to FIG. 5, a flowchart of a website experimentation process that may be used in connection with the arrangement of FIG. 4 is shown. The process may be used to set the importance ranking information based on visitor interactions with a website when one of the services used to provide information in connection with a web page is in poor health. In FIG. 5, some steps are shown as being performed by the website computers 12 and some steps are shown as being performed by the website experimentation tool 14. It will be appreciated that the allocation of tasks between the website computers 12 and the website experimentation tool 14 is exemplary and that the tasks may be allocated in other ways as well.

The process 60 may be initiated when a visitor makes a request (e.g., by clicking on a link) for a particular web page to be published. As indicated in FIG. 4, the web page may be constructed by requesting certain data from services 48, and using the data received from the service 48 to populate fields 50 in a web page template 52. The fields 50 include a field 54 which is to be populated with data from a service 55 which is in poor health. For purposes of the example, it is assumed that the importance ranking information designates the service request to the service 55 as being non-critical.

In an exemplary embodiment, the website experiment that is to be performed may be at least partially configured in advance. For example, in FIG. 4, a link 57 is shown which is designated as being a high value link. The website experiment may be configured to test the impact of any change on visitor interactions with the high value link 57. That is, when a change is made to the web page, the website experiment may be configured to assess whether the change resulted in an increase or a decrease in the percentage of time that visitors selected the high value link 57. As will be appreciated, to the extent that there is more than one high value link on a web page, the same experiment may be repeated for each different high value link on the web page. As will also be appreciated, whether a link is designated as being a high value link may be manually or dynamically configured. For example, on a web page with an add-to-cart link that permits a visitor to add an item to a shopping cart, the add-to-cart link may be manually designated as a high value link. As another example, on a web page with a submit-order link that permits a visitor to complete a purchase transaction, the submit-order link may be manually designated as a high value link. As another example, feedback may be obtained from visitors of the website regarding which features are considered valuable. As another example, a scoring algorithm may be used which monitors visitor interactions with the web page to determine which links are the most popular, and the most popular links may be dynamically configured as high value links. In another exemplary embodiment, the website experiment may be repeated for all links on the web page, without regard to whether the links are considered high value links.

Steps 62-66 are shown as being performed by the website computers 12. At step 62, it is determined that the service 55 is in poor health. For example, the poor health may be detected based on statistical evidence that the service 55 is in trouble, such as an increase in the average response time required by the service 55 to respond to service requests. The fact that the service 55 is in poor health may, for example, be determined by the service availability manager 36. At step 64, a feature associated with field 54 is omitted based on the importance ranking of the service request to the service 55. For example, the service availability manager 36 may include call decision logic which decides that a service request should not be made to the service 55 based on the importance ranking (i.e., non-critical) of the service request and the health (i.e., poor) of the service 55. When a service request is not made, and the relevant data is not obtained from the service 55, then the corresponding field 50 is not populated with the information that would have been provided by the service 55. Accordingly, at step 66, the web page is published omitting the feature associated with field 54.

The website computers 12 may also transmit a notification to the data collection/analysis computers 15 that the service 55 is in poor health. For example, when the service availability manager 36 makes the decision not to call the service 55, a notification may be sent to the data collection/analysis computers 15. This notification may then trigger a portion of the website experimentation process (shown as steps 68-74) performed at the data collection/analysis computers 15.

At step 68, the occurrence or non-occurrence of a monitored event is detected. For example, the monitored event may be whether the visitor selects the high value link. Whether the monitored event has occurred may be detected by monitoring log records received from the website computers 12. If the next log record received indicates that the visitor was presented with the web page associated with the high value link, then the monitored event may be assumed to have occurred. On the other hand, if the next log record received indicates that the visitor was presented with another web page, then the monitored event may be assumed not to have occurred.

As will be appreciated, the monitored event may potentially be any event that may occur with regard to a web page or a website. As previously indicated, any type of link may be designated as a high value link which may be monitored for visitor selection. Further, the monitored event may relate to other aspects of the visitors interaction with the website, such as how quickly the visitor moves from web page to web page, how many different pages are presented to the visitor during the visitor's session, and so on. This provides greater flexibility in assessing the value of a particular link or other feature of a web page. An indication of value may be obtained at any point in the visitor's interactions with the website.

At step 70, performance data for the web page is updated and performance variations are assessed. At step 72, it is determined whether the performance variations are statistically significant. As will be appreciated, performance data for the web page may be accumulated for many visits and for many visitors so that a large enough sample size may be obtained to make a meaningful comparison of the performance of the web page with and without the feature. Accordingly, portions of the process of FIG. 5 may be performed many times before a meaningful comparison may be made, and steps 70-72 may involve (at least in part) accumulating performance data for many visits and for many visitors.

Steps 70-72 may be performed in a variety of ways. In an exemplary embodiment, historical performance information may be retrieved by the data collection/analysis computers 15 from the data repository 20. The web pages retrieved in the historical search may serve as the "control group" for purposes of the website experiment, and the web pages published at step 66 may serve as the "test group" for purposes of the experiment. For example, a search may be made for web pages that were published during a preceding day or week of website visits and that are identical to the web page published in step 66, except that they include the omitted feature. The log records associated with such web pages may then be analyzed to determine whether the visitor was subsequently presented with the web page associated with the high value link, as described above. In other words, for web pages retrieved in the historical search, the percentage of time that the visitor selected the high value link may be determined. Once enough performance data is collected concerning the performance of the web pages published at step 66, a meaningful comparison may be made.

In another exemplary embodiment, rather than rendering the service 55 entirely unavailable for purposes of providing information to populate the field 54, the service may be rendered unavailable for only a portion of the traffic that views a particular web page. For example, the call decision logic may be configured such that the service request is permitted for 50% of visitors that are presented with a web page but is not permitted for the other 50% of the visitors. Thus, half the visitors may be presented with the feature, and the other half of the visitors may not be presented with the feature. The web pages in which the visitor is presented with the feature may serve as the "control group" for purposes of the website experiment, and the web pages in which the visitor is not presented with the feature may serve as the "test group" for purposes of the experiment. Once enough performance data is collected concerning the performance of the web page published with and without the feature at step 66, a meaningful comparison may be made.

In another exemplary embodiment, a multivariate analysis may be performed to assess which features on a web page are highly correlated with visitor selection of the high value link. For example, the multivariate analysis may be used where other features on a given web page are also changing, and a statistical attribution may be performed to attribute variations in the performance of the web page (e.g., whether visitors selected the high value link) to specific ones of the variations in the presentation of the web page. For example, a logit model may be used having the form $$Pr_{Selection} = \frac{e^{X_n\beta}}{1+e^{X_n\beta}},$$

where X is a vector comprising a set of explanatory variables (e.g., data describing the contents of different fields on the web page, which may be either numeric or categorical values), β is vector comprising a set of weighting coefficients for the explanatory variables X, and $Pr_{Selection}$ is the probability that the high value link will be selected on a particular web page having contents in accordance with the vector X). A regression algorithm may then be performed to determine an optimal set of weighting coefficients β. For example, for a sample data set in which some of the visitors were presented with the feature under consideration and some of the visitors were not presented with the feature under consideration (along with other variations in the presentation of the web page), and in which the performance history of the sample data set is known (i.e., whether the visitor selected the high value link), the regression algorithm may generate a set of weighting coefficients which optimally predicts the probability that a visitor will select the high value link based on the performance history for the web page visits in the sample data set. The weighting coefficient associated with the feature provided by the service 55 may then be analyzed to assess how highly correlated presentation of the feature is with visitor selection of the high value link.

In the above approaches, in order to increase the size of a sample data set, it may be desirable to group web pages and to analyze the performance history of the group of web pages as whole. For example, if a feature provided by the service 55 is presented on multiple web pages which are very similar (e.g., web pages that provide product details for similar products), it may be desirable to group the web pages together and assess the feature relative to the group of web pages as a whole.

The process described by steps 62-72 repeats until the results obtained are considered statistically significant. When enough performance data has been collected that statistically significant results have been generated, then at step 74 an event notification may be issued. At step 76, the website computers 15 store an updated importance ranking.

As will be appreciated, there are a variety of ways in which step steps 74-76 may be performed. For example, the data collection/analysis computers 15 may generate a result notification if a change in value has been detected and the change in value is considered to be statistically significant. Alternatively, the data collection/analysis computers 15 may generate a result notification as soon as enough samples have been collected to produce statistically significant results, even when no change in value has been detected. For example, if a feature has been temporarily removed from a web page, and if no change in value has been detected even after enough samples have been collected to produce statistically significant results, then this may be of interest. For example, this may indicate that no discernable value was delivered by the feature and may prompt its permanent removal. Also, as will be appreciated, it is not necessary that every website experiment yield statistically meaningful results. For those website experiments that do not yield statistically meaningful results, the results may be disregarded, if desired. In those situations where statistically meaningful results are produced, of course, such results may be used to enhance the website for visitors.

The manner in which the importance ranking information is updated may depend in part on the original importance ranking of the service request and the outcome of the website experiment. Thus, in the example of FIGS. 4-5, the service request is considered non-critical. However, a similar process may be used where a service request is considered critical, but the service 55 has failed and therefore the feature associated with field 54 is still omitted. For a service request that is originally considered non-critical, the different possible outcomes may include a dramatic decrease in visitor selections of the high value link (indicating that the importance ranking of the feature should be raised to critical from non-critical), a moderate decrease in visitor selections of the high value link (indicating that the importance ranking of the feature should remain at non-critical), no decrease or an increase in visitor selections of the high value link (indicating that the feature should be removed from the web page), and so on. For a service request that is originally considered critical, the different possible outcomes may include a dramatic decrease in visitor selections of the high value link (indicating that the importance ranking of the feature should remain at critical), a moderate decrease in visitor selections of the high value link (indicating that the importance ranking of the feature should be downgraded to non-critical), no decrease or an increase in visitor selections of the high value link (indicating that the feature should be removed from the web page), and so on. As will be appreciated, if a non-binary importance ranking scheme is used, the above-described results may occur on a continuum.

Where there are multiple high value links on a given web page, the performance of each feature may be considered in the aggregate of the multiple high value links. That is, a feature that is not considered valuable in the context of one high value link but is considered valuable in the context of a another high value link may be retained. Alternatively, a feature that is considered moderately valuable in the context of the two high valuable links individually may be critical when considered in the context of the combination of the two high valuable links. As will be appreciated, other permutations and combinations may be possible, particularly if a non-binary importance ranking scheme is used.

The updated importance ranking information may be generated by the data collection/analysis computers 15 and transmitted to the website computers 12 as part of a data message that accompanies the notification. Alternatively, the importance ranking information may be generated by the website computers 12 based on the indication of the results of the website experiment conducted by the website experimentation tool 14.

In FIG. 5, website experiments are performed in which features are randomly or pseudo-randomly removed from a web page and the impact of removing the feature from the web page is automatically assessed. The results of the website experiments may be used to enhance the operation of the service availability manager 36 described in the '665 patent application by making the importance ranking information more accurately reflect visitor preferences. The importance ranking information may be used to determine how long to wait for a response from a service when the service is less healthy. With accurate importance ranking information, it is more likely that visitors will be presented with features that are considered critical, less likely that visitors will have to wait for features that are considered non-critical, and so on.

In addition, the visitors' experience may be enhanced to the extent it is less cluttered with features that are not considered valuable. In the example of FIG. 4, if no negative impact on removing the feature is detected, then the feature may be removed. When other service interruptions occur, additional website experiments may be performed which indicate that one or more other features on the same page should be removed. Eventually, the web page may come to a steady state configuration in which all of the non-beneficial features are removed and there are no other features left that should be removed.

Referring now to FIGS. 6A-6C and FIG. 7, another example with additional details is described. In an exemplary embodiment, as previously indicated, traffic pattern analysis logic 37 may be implemented in accordance with the teachings of the '890 application. The '890 application discloses techniques which may, for example, be used to highlight the most heavily trafficked links on a web page or website. Such techniques may also be used in connection with conducting website experiments. FIGS. 6A-6C and FIG. 7 show an arrangement in which the traffic pattern analysis techniques may be used to assess value delivered to visitors of a website.

Figure 6A:
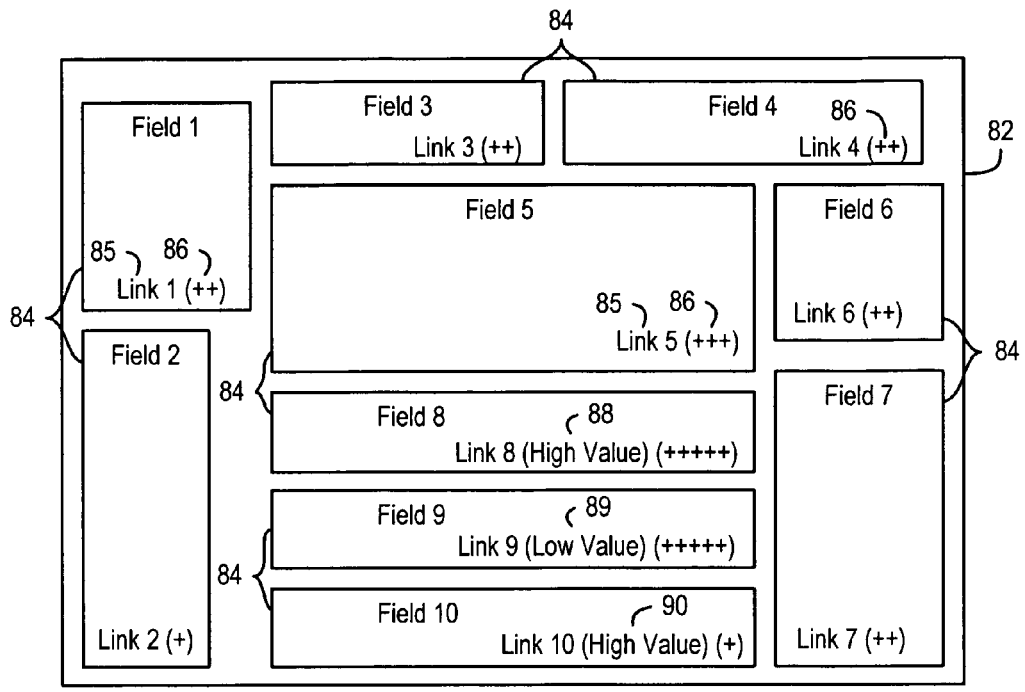
FIGS. 6A-6C are web pages for which a traffic pattern analysis is conducted according to an exemplary embodiment.
Figure 6B:
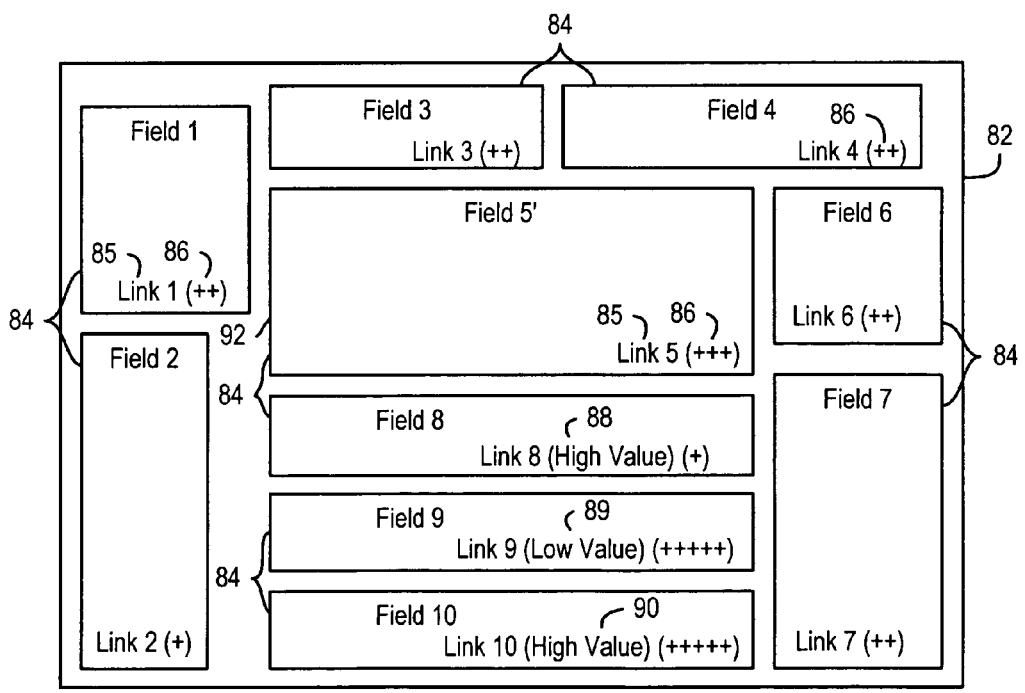
Figure 6C:
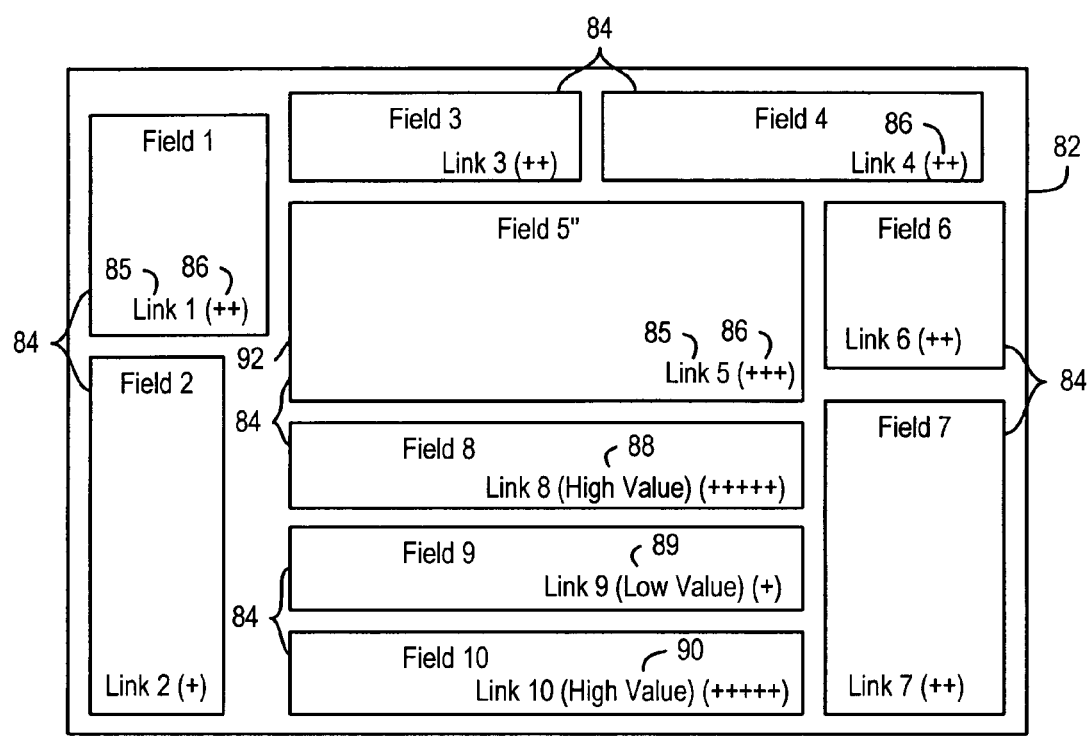

Referring first to FIGS. 6A-6C, a web page 82 is shown which comprises a plurality of fields 84. Each field 84 comprises a link 85 that may be selected by a visitor. Next to each link 85 is shown an indicator 86 (e.g., one or more "+" symbols) which represents the level of traffic through a particular link. For example, a link that has a "++" symbol next to it may be twice as heavily trafficked as a link with a single "+" symbol next to it. The indicators 86 may be displayed to visitors or may simply represent tracking information stored in memory. If the indicators 86 are displayed to visitors, a more graphically appealing approach may be used. For example, as disclosed in the '890 application, the font size, coloring, brightness and so on of text links may be altered. For example, if five different font sizes are employed, each additional "+" in FIG. 6A may correspond to an increase in font size. Other approaches may also be used.

In the example of FIGS. 6A-6C and FIG. 7, the indicators 86 provide a measure of traffic through a link on a website for purposes of website experimentation, and are shown in FIGS. 6A-6C only for purposes of describing operation of a website experiment. Herein, for purposes of discussion, it is assumed that neither the indicators nor variations thereof are displayed to visitors but rather are simply stored as tracking information in memory.

In FIG. 6A, it is seen that there are twenty-five "+" indicators 86 distributed over ten links 84. The indicators 86 may be allocated to the links based on the popularity of each link 84, with the total number of indicators 86 remaining constant. As visitors select links, each selection not only increases the ranking of the selected link but decreases the ranking of unselected links. Thus, as one link 84 becomes more heavily trafficked (and receives more "+" indicators 86), other links inherently become less popular (and "+" indicators 86 are taken away). It will be appreciated that, in practice, the tracking information may be stored in a numeric format (e.g., as floating point numbers), such that a large or potentially infinite number of possibilities exists for the rank assigned to each link 84.

The links 84 include links 88, 89 and 90. Links 88 and 90 are high value links and link 89 is a low value link. As shown in FIG. 6A, link 90 is considered a high value link but only receives a small portion of the traffic. Conversely, link 89 is considered a low value link but receives a large portion of the traffic. Whether a link is a high value link or a low value link may be determined from the perspective of the visitor. Merely because a link is popular does not mean that it is high value to a visitor. For example, a link may contain a promise of a financial reward if selected, thereby making the link heavily trafficked, but the web page that is provided responsive to selection of the link may not adequately fulfill the promise of the financial reward. In an exemplary embodiment, upon selecting a link and viewing content on the web page published responsive to the selection of the link, visitors May be provided with the ability to provide feedback regarding whether the found a link to be valuable. For example, the toolbar that is presented to the visitor may include two back buttons: one back button (e.g., "Back Happy") which the visitor may select to indicate that the web page contained content that the visitor considered valuable, and another back button (e.g., "Back Unhappy") which the visitor may select to indicate that the web page did not contain content that the visitor considered valuable. As another example, if a visitor proceeds with purchasing a product displayed on a web page published responsive to the selection of a link, the fact that the visitor proceeded with a transaction indicates that the web page contained content that the visitor considered valuable. As will be appreciated, the successful completion of a transaction may be mutually beneficial to both the website and to the visitor. The value of the transaction may be used as an indication of the value of the web page content to the visitor. Other approaches may also be used to solicit visitor feedback.

Figure 7:
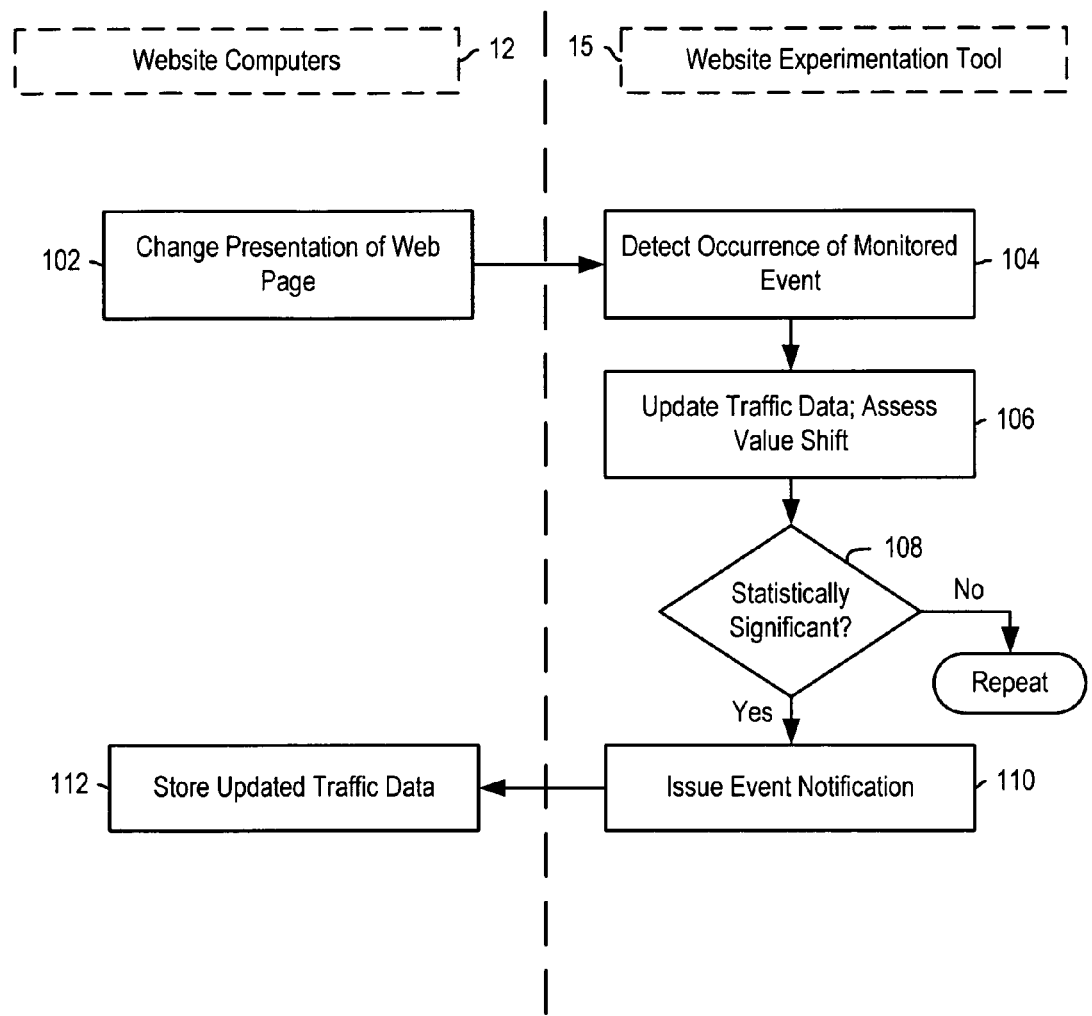
FIG. 7 is a flowchart of a website experimentation process implemented in connection with the traffic pattern analysis system of FIGS. 6A-6C according to an exemplary embodiment.

Referring, now also to FIG. 7, a flowchart of a website experimentation process that may be used in connection with the arrangement of FIGS. 6A-6C is shown. In an exemplary embodiment, in FIG. 7, the traffic pattern analysis technique described above is employed. Thus, as visitors select links, the selection not only increases the ranking of the selected links but decreases the ranking of unselected links. At step 102, the presentation of the web page is changed. For example, as shown in FIG. 6B, a field 92 may be changed. A data message may be sent to the website experimentation tool 14 indicating that the presentation of the web page has changed.

The data collection/analysis computers 15 may then proceed in the manner previously described in connection with FIG. 5. That is, the occurrence of a monitored event may be detected at step 104. At step 106, traffic data for the web page is updated and performance variations are assessed. At step 108, it is determined whether the performance variations are statistically significant. Again, as discussed above in connection with FIG. 5, enough performance data for the web page may be accumulated for many visits and for many visitors so that a large enough sample size may be obtained to make a meaningful comparison of the performance of the web page with and without the feature. Accordingly, portions of the process of FIG. 7 may be performed many times before a meaningful comparison may be made, and steps 106-108 may involve (at least in part) accumulating performance data for many visits and for many visitors. A control group and a test group may be defined as above.

With reference to FIG. 6B, it is seen that the change in field 92 has resulted in an increase in traffic through high value link 90. However, the increase in traffic comes at the expense in traffic through high value link 88. Accordingly, no overall change in value delivered to the visitor occurs as a result in the change in field 92. With reference to FIG. 6C, as another example, it is seen that the change in field 92 has resulted in an increase in traffic through high value link 90. This time, the increase in traffic comes at the expense in traffic through low value link 89. Accordingly, the visitor experiences an overall increase in value delivered as a result in the change in field 92. Thus, the traffic pattern analysis logic 37 provides another mechanism for assessing changes in value delivered to visitors of the website. Particularly, the traffic pattern analysis logic 37 allows shifts in traffic patterns to be automatically analyzed in response to any random or pseudo-random change in the presentation of a web page, and enables unintended changes in traffic patterns to be detected that may not be detected by examining traffic through a single link in isolation.

At step 110, an event notification is issued. For example, the data collection/analysis computers 15 may be configured to generate an event notification upon detecting a statistically significant shift in traffic patterns. At step 112, the website computers 15 store updated traffic data for further analysis. Again, it will be appreciated there steps 110-112 may be performed a variety of ways, as generally discussed above in connection with steps 74-76 of FIG. 5.

In an exemplary embodiment, the results of a website experiment performed as described in connection with FIGS. 6A-6C and FIG. 7 may be provided to website developers for further analysis. For example, as described in connection with FIGS. 6B-6C, changing a field may have an unintended consequence on website traffic. Upon detecting such an unintended consequence, the data collection/analysis computers 15 may issue an event notification so that website developers may be alerted to the situation and take corrective action.

In another exemplary embodiment, the results of a website experiment performed as described in connection with FIGS. 6A-6C and FIG. 7 may be used to automatically reconfigure an aspect of the presentation of the website. For example, the presentation of links may be altered by link prominence logic 38 to direct traffic to higher value features and/or to reflect a result of the website experiment. For example, for a text link, the link may use a larger font, a bolded font, flashing font, and so on. For other types of links, other graphical techniques may be used, such as magnifying the link, presenting the link in a fish-eye view, graying out less popular areas, sorting links based on popularity or visitor feedback, placing links in more or less prominent locations on a web page (e.g., by migrating features into or out of locations that require scrolling down in order to be viewed), and so on.

Figure 8:
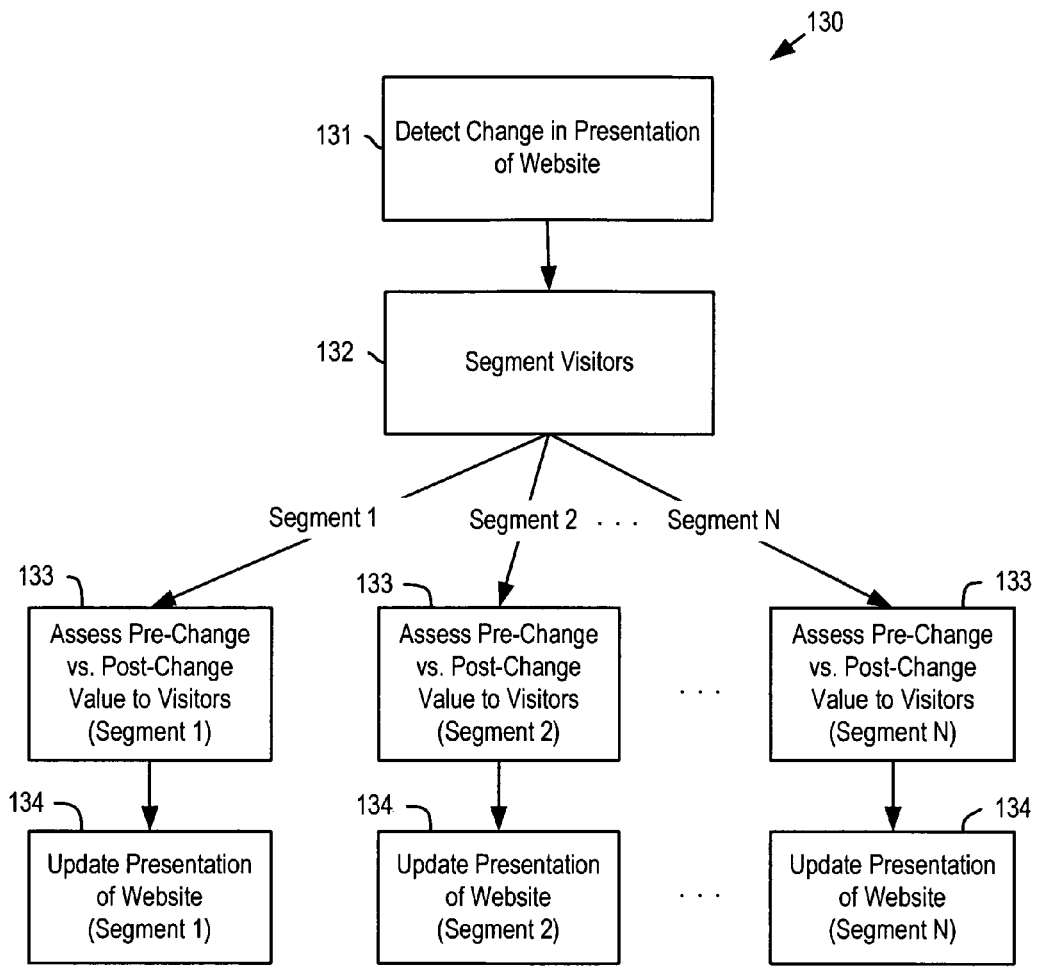
FIG. 8 is a flowchart of a website experimentation process implemented by the system of FIG. 1 according to another exemplary embodiment.

Referring now to FIG. 8, in step 32 of FIG. 2, value may be assessed in the context of individual visitors or segments of visitors. In FIG. 8, at step 131, a change is detected in the presentation of a website. Step 131 may be performed as described above in connection with step 31 of FIG. 2.

At step 132, visitors are segmented, for example, by placing visitors with like-attributes into common segments. The placement of a visitor into a segment may be performed based on a number of different attributes. For example, the placement into a segment may be performed based on visitor behavior (e.g., click stream behavior, purchase history, and so on). For example, visitors that exhibit similar shopping behavior when provided with similar website presentations (e.g., simple versus complicated look-and-feel, trendy versus traditional look-and-feel, particular color schemes, and so on) may be placed into common segments. As another example, visitors that access the website using similar hardware (e.g., personal computers versus portable handheld wireless devices versus television set top boxes) or using specialized interfaces (e.g., audio-only interfaces for the visually impaired) may be placed into common segments. The visitor behavior used to place visitors into segments may be observed over multiple visits to the website. The visitor may be recognized, for example, based on the unique browser ID of the visitor, i.e., so that anyone who accesses the website from that UBID (a particular machine) will be assumed to be the same visitor. If the visitor is required to sign in to the website, or is otherwise required to provide identifying information, the visitor may be recognized on this basis as well. At step 133, the change in value delivered to visitors of the website as a result of the change in the presentation of the website is assessed. At step 134, the presentation of the website may be changed to reflect feedback obtained during steps 131-133.

The process of FIG. 8 permits the website to be personalized to the visitor based on the results of website experiments. For example, by placing traffic into segments, and having features added and removed from the website experimentally, the impact of adding or removing features may be assessed on a segment-by-segment basis. Further, based on the results of the website experiments, updates to the website may be made on a segment-by-segment basis (e.g., features may be made visible to some segments of traffic but not to other segments of traffic). This allows certain features to be presented to segments which may respond to such features, but prevents such features from being presented to segments which likely will not respond to them. For the latter segment, this avoids cluttering the experience of members of the segment with features such segment members will not use anyway. In other exemplary embodiments, the website may be customized to configure whether the website is simple or complicated, whether the website provides currency converters, whether the website is in a particular language, whether the website has particular color schemes, whether the website has a look-and-feel (e.g., trendy, traditional, and so on) which targets particular age groups, and so on. Thus, in addition to showing particular products to particular visitors, the nature of the website that is presented may be customized.

Here and throughout, terms such as "visitor" and "website" are to be understood in the broadest possible sense. A "visitor" may be an individual who visits and views or otherwise perceives the content of a website and pages therein via a web browser or other client software program running on a personal computer, wireless handheld device, or the like, but may also be, for example, a corporate or other entity whose servers access published web content by invoking web services through appropriate application programming interfaces (APIs). In a similar vein, and as will be apparent from the foregoing, terms such as "web page," "website," and so forth are used to give specific illustrative examples of settings in which on-line content can be presented to and perceived by visitors. The term "user" includes "visitors" and also includes any other individuals or entities that may use the systems and methods described herein, including individuals and entities that own, develop, maintain or otherwise operate websites that take advantage of the teachings herein. Such examples are not intended to be limiting, and persons of skill in the art will appreciate that many other such settings now known or yet to be developed may be suitable to the practice of the present invention in specific embodiments.

The invention is described above with reference to drawings. These drawings illustrate certain details of specific embodiments that implement the systems and methods and programs of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing computer processor, or by a special purpose computer processor incorporated for this or another purpose or by a hardwired system.

As noted above, embodiments within the scope of the present invention include program products comprising machine-readable media having machine-executable instructions or data structures stored thereon. Such machine-readable media can be any available media which can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to store desired program code in the form of machine-executable instructions or data structures and which can be accessed by a general purpose or special purpose computer or other machine with a processor. Machine-executable instructions comprise, for example, instructions and data which cause a general purpose computer, special purpose computer, or special purpose processing machines to perform a certain function or group of functions.

Embodiments of the invention are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present invention may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the invention might include a general purpose computing device in the form of a computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD-ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the invention have been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

What is claimed is:

1. A computer-implemented data processing system comprising:
　a computing device operative to execute:
　　web page generation logic that generates web pages to be provided to visitors of a website, wherein at least one generated web page includes one or more features; and
　　website experimentation logic that detects a random or pseudo-random change in the manner in which the web page generation logic generates one or more of the web pages, wherein the random or pseudo-random change is caused by a disturbance in the operation of the website, and the website experimentation logic being configured to assess how the change impacts visitor interactions of one or more visitors with the website, wherein assessing how the change impacts visitor interactions of the one or more visitors comprises assessing how the change impacts a level of visitor traffic through a link present in the generated web page;
　　wherein, in response to the assessment of how the change impacted visitor interactions of the one or more visitors, the web page generation logic changes one or more features of the at least one web page when the web page generation logic generates the at least one web page to be provided to a subsequent visitor of the website, wherein the subsequent visitor is a different visitor than the one or more visitors, wherein the web page generation logic changes the one or more features of the at least one web page based at least in part on the assessment of how the random or pseudo-random change impacted visitor interactions of the one or more visitors.

2. A system as defined in claim 1, wherein the random or pseudo-random change comprises a change that is implemented as a result of a system optimization algorithm.

3. A system as defined in claim 2, wherein the system optimization algorithm operates to optimize an aspect of presentation of the one or more web pages to the visitors based on performance history regarding link selections received from visitors.

4. A system as defined in claim 1, wherein the random or pseudo-random change comprises a change that is implemented responsive to health variations of a service that provides information used to construct the one or more web pages.

5. A system as defined in claim 1, further comprising
a plurality of services configured to receive service requests from the web page generation logic and to provide responses thereto;
a service availability manager configured to mediate access to the plurality of services; and
wherein the web page generation logic is configured to generate the web pages by accessing the plurality of services to obtain information to place on the web pages;
wherein the service availability manager mediates access to the services based on an importance ranking of the service requests, the importance ranking reflecting the importance of the information provided by the service to a task being performed;
wherein the change in the manner in which the web page generation logic generates the one or more of the web pages comprises a change that is caused by a manner in which the service availability manager mediates access to the services; and
wherein the data processing system is configured to change the importance ranking information based on the assessment of how the change impacts visitor interactions of the one or more visitors with the website.

6. A system as defined in claim 1, wherein the random or pseudo-random change causes a feature of a web page to be omitted.

7. A system as defined in claim 6, wherein the random or pseudo-random change comprises a change that results from a network partition that prevents the flow of data needed for the presentation of the feature of the web page.

8. A system as defined in claim 1, wherein the random or pseudo-random change comprises a change that is implemented responsive to a change in program logic that provides information used to construct the one or more web pages.

9. A system as defined in claim 1, further comprising website personalization logic configured to place visitors into segments, such that the website experimentation logic may assess how the change impacts visitor interactions with the web page for different ones of the segments of visitors.

10. A system as defined in claim 1, wherein the random or pseudo-random change comprises a change in advertisements presented on the web page, the change in advertisements being implemented responsive to a change in an advertising campaign.

11. A system as defined in claim 1,
wherein the system further comprises traffic pattern analysis logic configured to assess traffic through different links on a web page, the traffic pattern analysis logic being configured to assign a score to each link to reflect a level of traffic through the link;
wherein the traffic pattern analysis logic is configured such that, when a visitor selects one link on a web page, the score of the selected link increases at the expense of the scores of the unselected links; and
wherein the website experimentation logic is configured to use the scores assigned by the traffic pattern analysis logic to assess how the change impacts visitor interactions with the web page.

12. A system as defined in claim 1, wherein the website experimentation logic further comprises
a plurality of computer-implemented nodes;
a plurality of computer-implemented partitions, the plurality of partitions comprising processes configured to receive data messages from the web page generation logic and to produce desired outputs based on the data messages, the plurality of partitions being owned by the plurality of nodes; and
wherein the plurality of partitions are configured (i) to permit each of the data messages from the web page generation logic to be received at an arbitrary one of the nodes and (ii) to forward the data message to one or more other nodes responsible for participating in producing result outputs relating to how the change impacts visitor interactions with the website.

13. A computer-implemented data processing method, comprising:
under control of one or more configured computer systems,
detecting a change in presentation of one or more web pages to one or more visitors of a website, wherein the change is caused by a random or pseudo-random disturbance in the operation of the website;
responsive to the detecting step, assessing how the change impacts visitor interactions of the one or more visitors with the website, wherein assessing how the change impacts visitor interactions of the one or more visitors comprises assessing how the change impacts a level of visitor traffic through a link present in the one or more web pages; and
responsive to the assessment of how the change impacted visitor interactions of the one or more visitors, changing one or more features of the one or more web pages when generating the one or more web pages to be provided to a subsequent visitor of the website, wherein the subsequent visitor is a different visitor than the one or more visitors, wherein the one or more features of the one or more web pages are changed based at least in part on the assessment of how the detected change impacted visitor interactions of the one or more visitors with the website.

14. A method as defined in claim 13, wherein the detected change occurs as a result of operation of a system optimization algorithm.

15. A method as defined in claim 13, wherein the detected change is an unscheduled change.

16. A method as defined in claim 13,
wherein the method further comprises controlling the health of a service, including monitoring the health of the service, permitting fewer service requests to be made to the service when the service is less healthy than a threshold, and permitting more service requests to be made to the service when the service is more healthy than the threshold;
wherein each of the service requests has an importance ranking which reflects the importance of the information provided by the service to a task being performed;
wherein, during the controlling step, the service requests with a higher importance ranking are more likely to be made to the service and the service requests with a lower importance ranking are less likely to be made to the service; and wherein the detected change occurs as a result of the service being less healthy than the threshold.

17. A method as defined in claim 16, wherein the method further comprises updating the importance ranking based on the assessment of how the detected change impacts visitor interactions of the one or more visitors with the website.

18. A method as defined in claim 13, further comprising:
assessing traffic through different links on a web page;
maintaining scores for each of the different links to reflect a level of traffic through each link, the scores being assigned such that, when a visitor selects one link on a web page, the score of the selected link increases and the scores of the unselected links decrease; and
assessing how the detected change impacts visitor interactions with the website using the scores maintained for each of the different links.

19. A method as defined in claim 13, further comprising
collecting time-series data from web page generation logic at a first node, the time-series data relating to contents of the web pages;
sorting the time-series data, including routing the time-series data to a second node;
wherein assessing how the detected change impacts visitor interactions of the one or more visitors with the website comprises processing the time-series data at the second node as it is received from the first node; and
wherein the time-series data is collected, sorted, and processed at a rate which is not less than the rate at which new time-series data is received from the web page generation logic.

20. A method as defined in claim 13, wherein the random or pseudo-random disturbance causes a feature of a web page to be omitted.

21. A method as defined in claim 20, further comprising determining that omission of the feature does not negatively impact visitor interactions with the website and, in response, removing the feature from the web page for at least some subsequent visitors of the website.

22. An article of manufacture comprising a computer-readable storage medium whose contents direct a computing system to:
detect changes in the presentation of one or more web pages to one or more visitors of a website, wherein the changes are caused by a random or pseudo-random disturbance in the operation of the website;
conduct website experiments automatically responsive to the changes being detected, the website experiments being configured to assess how the changes impact visitor interactions of the one or more visitors with the website, wherein assessing how the changes impact visitor interactions of the one or more visitors comprises assessing how the changes impact a level of visitor traffic through a link present in the one or more web pages; and
responsive to the assessment of how the changes impacted visitor interactions of the one or more visitors, change one or more features of the one or more web pages when generating the one or more web pages to be provided to a subsequent visitor of the website, wherein the subsequent visitor is a different visitor than the one or more visitors, wherein the one or more features of the one or more web pages are changed based at least in part on the assessment of how the detected changes impacted visitor interactions of the one or more visitors with the website.

23. An article of manufacture as defined in claim 22, wherein the random or pseudo-random disturbance is a result of a system optimization algorithm.

24. An article of manufacture as defined in claim 23, wherein the system optimization algorithm operates to optimize an aspect of the presentation of the one or more web pages to the visitors based on performance history regarding link selections received from visitors.

25. An article of manufacture as defined in claim 22, wherein the random or pseudo-random disturbance is a response to health variations of a service that provides information used to construct the one or more web pages.

26. An article of manufacture as defined in claim 22, wherein the detected changes comprise a change that causes a feature of a web page to be omitted.

27. An article of manufacture as defined in claim 26, wherein at least one detected change results from a network partition that prevents the flow of data needed for the presentation of the feature of the web page.

* * * * *